March 25, 1930.

W. L. EVANS

DEVICE FOR MAKING RING JOINTS

Re. 17,628

Original Filed Aug. 25, 1925 5 Sheets-Sheet 1

Witnesses

Chas. L. McDonald

E. N. Lovewell

Inventor

William L. Evans

By

E. G. Siggers

Attorney

March 25, 1930.

W. L. EVANS

DEVICE FOR MAKING RING JOINTS

Re. 17,628

Original Filed Aug. 25, 1925 5 Sheets-Sheet 2

Witnesses

Chas. L. McDonald.
E. N. Lovewell

Inventor
William L. Evans

By E. G. Siggers.

Attorney

March 25, 1930. W. L. EVANS Re. 17,628

DEVICE FOR MAKING RING JOINTS

Original Filed Aug. 25, 1925 5 Sheets-Sheet 3

Witnesses

Chas. L. McDonald.
E. N. Lovewell

Inventor

William L. Evans

By

E. G. Siggers

Attorney

March 25, 1930. W. L. EVANS Re. 17,628

DEVICE FOR MAKING RING JOINTS

Original Filed Aug. 25, 1925 5 Sheets-Sheet 4

Witnesses

Chas. L. McDonald.
E. N. Lovewell

Inventor
William L. Evans

By
E. G. Siggers
Attorney

March 25, 1930. W. L. EVANS Re. 17,628

DEVICE FOR MAKING RING JOINTS

Original Filed Aug. 25, 1925 5 Sheets-Sheet 5

Witnesses

Chas. L. McDonald

E. N. Lovewell

Inventor

William L. Evans

By

E. G. Siggers

Attorney

Reissued Mar. 25, 1930

Re. 17,628

UNITED STATES PATENT OFFICE

WILLIAM L. EVANS, OF WASHINGTON, INDIANA

DEVICE FOR MAKING RING JOINTS

Original No. 1,617,622, dated February 15, 1927, Serial No. 52,445, filed August 25, 1925. Application for reissue filed February 14, 1929. Serial No. 339,968.

This invention relates to devices for joining trim, molding, or other material, by what is known as a ring joint. In making this type of joint, after the pieces to be joined are cut in the proper form, channels or grooves are cut in their rear faces in such a manner as to form a continuous circular channel when the pieces are properly joined. While the pieces are clamped in this position, a ring is forced into this channel, and this ring is of such size and shape that it will exert a forceful gripping action against the inner wall of the channel and hold the joint tightly together.

Important objects of the invention are to provide improved means for clamping the pieces while the channel is being cut, to provide improved means for cutting said channel, and to provide improved means for expanding the ring and forcing it with great pressure over the circular boss defined by the channel, thus forming a joint that is held together with great pressure, so that it will not open even when there is considerable shrinkage in the wood itself. The efficacy of the joint is also increased by an improvement in the formation of the ring itself.

The specific construction of one embodiment of the invention is fully shown in the accompanying drawings, and the advantages thereof will be specifically explained in connection therewith.

Figure 1:
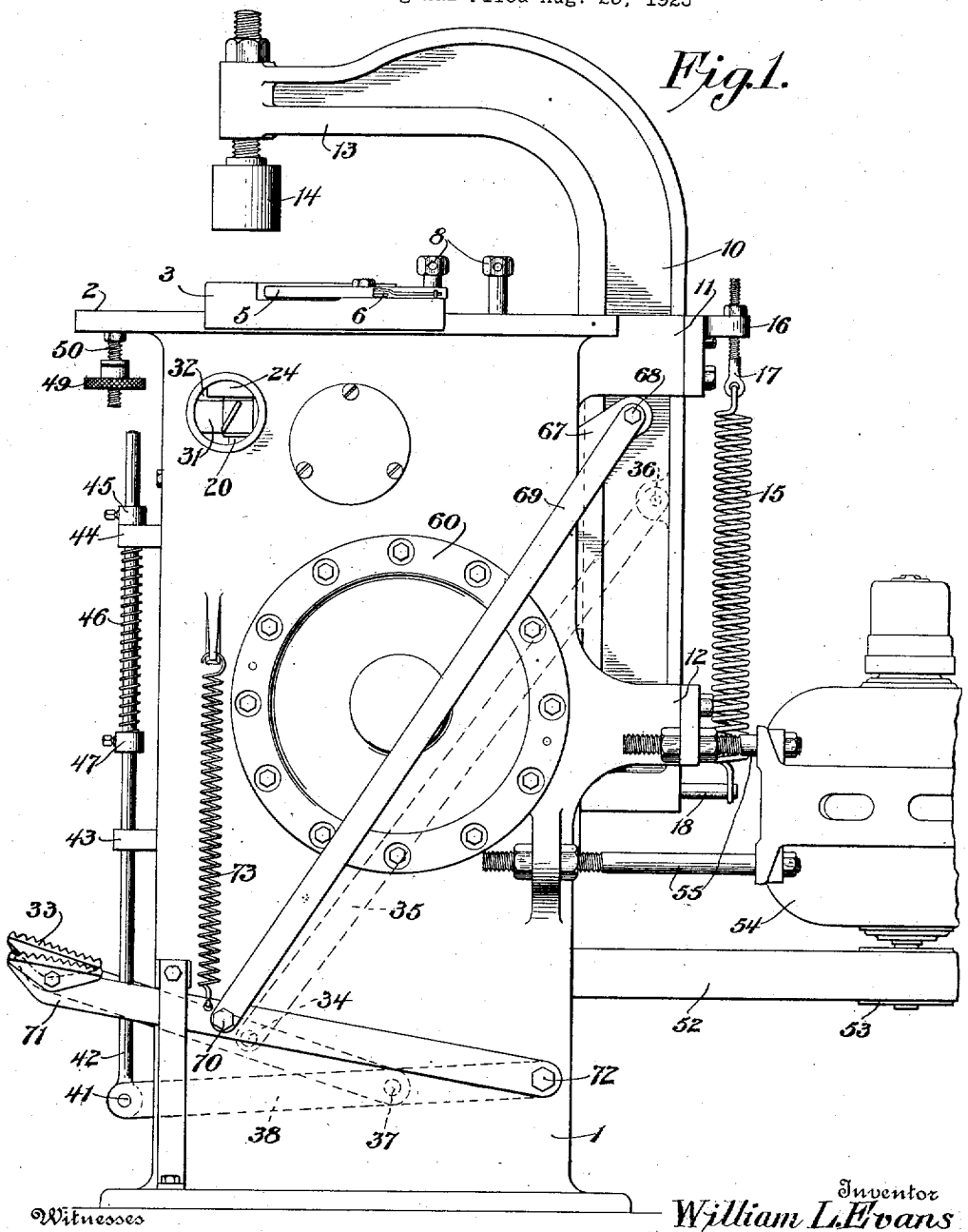
Figure 1 is a side elevation of the machine.

The machine for making the ring joints comprises a main frame 1, in the form of a rectangular housing with a work table 2 at its upper end. Mounted for slidable adjustment of this table is a gage bracket 3, the form of which will depend upon the character of the joint to be formed. In the present instance, I have shown a bracket used for making corner joints, and having a right angular seat 4 against which rest the ends of the two pieces to be joined. A dog 5 is pivotally mounted on one side of the bracket, and is yieldably held by a spring 6, so that a notch 7, formed at its inner end, engages a stud 8 which is adjustably mounted in a slot 9 formed longitudinally of the table. It is preferred to use two of these studs when joining wide pieces, so that two rings may be used on each joint.

A vertical bar 10 is slidably mounted at the rear side of the frame 1 in guideways 11 and 12, and is formed with an overhanging head 13, in which a ram 14 is adjustably mounted. This ram is used for clamping the work while the channel is being cut, as well as for forcing the ring into the channel for completing the joint. The head 13 is normally held in raised position by a strong coil spring 15, which is connected at its upper end to a flange 16 at the rear end of the table by means of an eye bolt 17, and is connected at its lower end to a stud 18 projecting from the lower end of the bar 10.

The intermediate portion of the frame 1 is formed with an oil reservoir 19, within which the power-operated mechanism operates. A vertical cutter shaft 20 is mounted for rotatable and rectilinear movement in a bearing 21, which contains suitable packing to prevent escape of the oil. The upper portion of the cutter shaft is mounted in a bearing 22, at the lower side of a housing 23 secured underneath the table. A cutter head 24, secured to the upper end of the shaft 20, is formed from a cylindrical steel barrel, and is provided with opposed drag teeth 25 adapted to cut the channel, and spurs 26 and 27, slightly longer than the drag teeth, for cutting the outer and inner sides, respectively, of the channel. A flat ring 28 is adapted to rest on a shoulder 29, and is provided with an opening just large enough for the cutter head to pass through, so that the work 30 may be firmly supported. A fan 31 is secured to the cutter shaft 20 within the housing 23, and blows the shavings out through an opening 32 formed in the side of the housing.

The mechanism for drawing the head 13 downwardly to clamp the work on the table 2 comprises a pedal 33, located at the left-hand side of the machine, and connected intermediately by a pivot stud 34 to the lower end of a link 35. The upper end of this link is pivotally connected at 36 to the bar 10. The rear end of the pedal 33 is pivoted on a stud 37, which projects from an intermediate point of a lever 38 through an arcuate slot 39 in the left-hand side of the frame. The rear end of the lever 38 is pivoted at 40 to the frame, and its front end projects forwardly through the front side of the frame, and is pivotally connected at 41 to the lower end of a vertical rod 42. This rod is guided for vertical movement in guide members 43 and 44 secured to the front side of the frame. A stop 45, adjustably secured to the rod, engages the guide member 44 to limit the downward movement of the rod, while an expansile coil spring 46, acting between the guide member 44 and a collar 47 adjustably secured to the rod, normally holds the latter in its lowermost position.

When operating the machine to cut the circular channel, the pieces to be joined are placed in the proper position against the seat 4, and the pedal 33 is depressed. The first result of the depression of the pedal 33 is to draw the head 13 downwardly through the medium of the link 35 against the tension of the spring 15 until the work is clamped beneath the ram 14. During this movement, the pivot 37 forms the fulcrum about which the pedal 33 moves. When the work is thus clamped and the head 13 can not move downwardly any farther, increased pressure on the pedal 33 causes the latter to rock about the pivot 34 as a fulcrum, and to swing the lever 38 upwardly about the pivot 40 as a fulcrum, raising the rod 42. A lug 48 on the lever 38 then engages the lower end of the cutter shaft 20, and raises the cutter into engagement with the work 30. The cutter is constantly rotated, by means hereinafter described, and cuts a circular channel, the depth of which is limited by the engagement of the upper end of the rod 42 with a gage block 49 adjustably mounted on a threaded spindle 50, which extends downwardly from the table 2.

The cutter shaft 20 is driven by means of a pulley 51 secured to its lower end, and connected by a belt 52 to a pulley 53 secured to the shaft of a motor 54, which is supported on bolts 55 projecting from the rear side of the frame. These bolts are mounted for longitudinal adjustment so as to adjust the tension of the belt 52, and the pulley 51 is long enough to allow for the vertical movement of the cutter shaft without causing the belt to run off.

Figure 2:
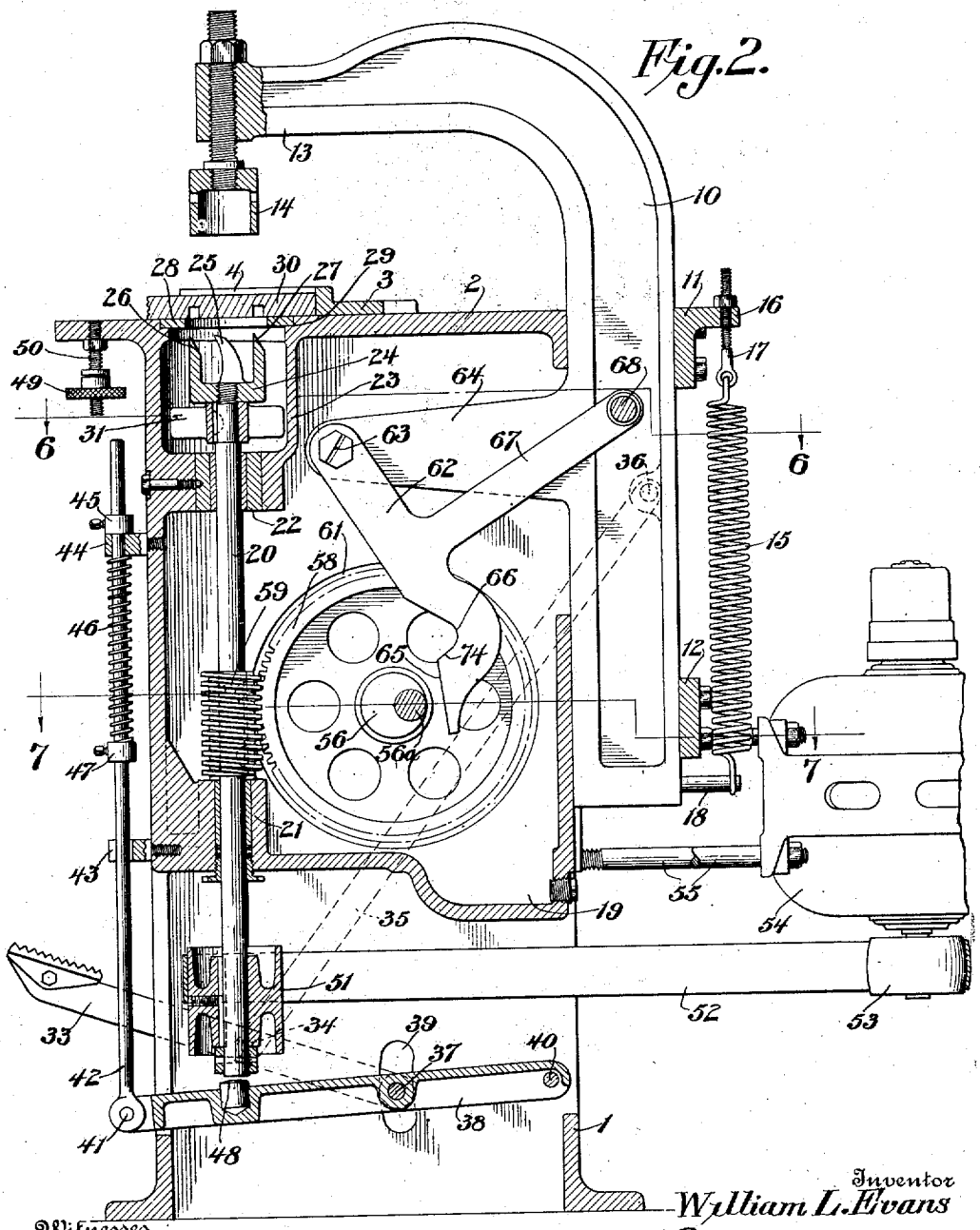
Figure 2 is a vertical longitudinal section thereof.

A power shaft 56 is mounted transversely in bearings 57 to rotate within the oil reservoir 19, and has a worm gear 58 keyed thereon, which is driven in a clockwise direction, as viewed in Figure 2, by a left-hand worm 59 secured to the cutter shaft 20. The bearings 57 are supported in side plates 60, which are securely bolted to the sides of the frame to cover openings 61, which are provided for convenience in assembling the mechanism. Suitable gaskets are provided beneath the side plates 60 to prevent leakage of oil from the reservoir 19, and oil holes 57ᵃ are provided to insure perfect lubrication of the bearings.

The shaft 56 and worm gear 58 rotate idly during the operation of cutting the circular channel, but are operatively connected to the bar 10, so as to force the head 13 and ram 14 downwardly with great pressure when the ring is being forced into the channel to complete the joint. The mechanism for effecting this connection will now be described. A dog 62 is pivotally mounted at 63 on an arm 64, which projects forwardly from the bar 10. This dog terminates in a flat nose 65 above which is a notch 66. This notch, when the dog is moved into proper position, is adapted to be engaged by a crank 56ᵃ formed on the shaft 56, and to be drawn downwardly thereby. The dog 62 is formed with a rearwardly projecting arm 67, the rear end of which is pivotally connected, as at 68, to the upper end of a link 69 which extends downwardly at the right-hand side of the frame, and at its lower end is pivotally connected, as at 70, to a pedal 71. The rear end of the pedal 71 is fulcrumed at 72 on the frame, and the pedal is normally held up by a coil spring 73 attached to the side of the frame.

Figure 3:
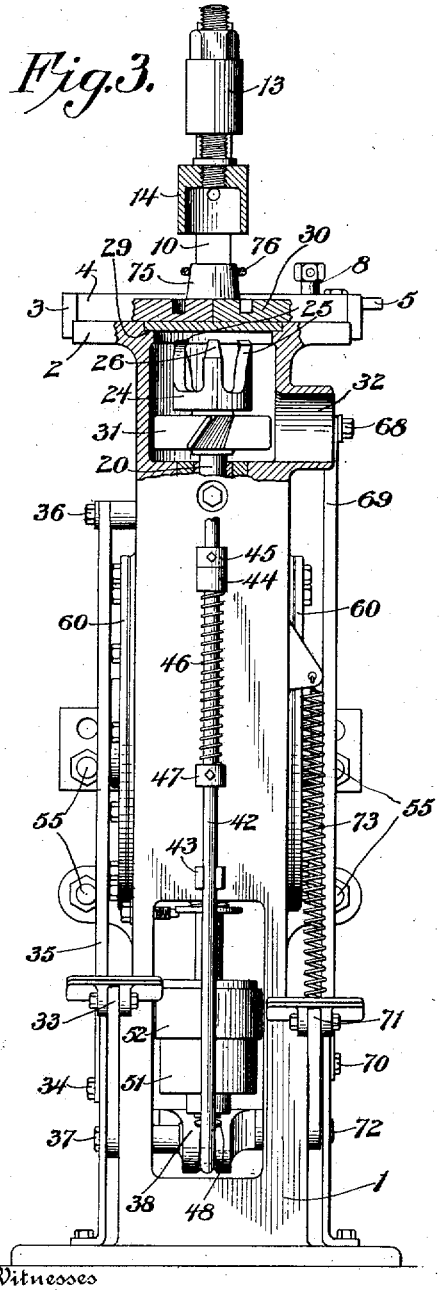
Figure 3 is a front elevation with parts shown in section.
Figure 4:
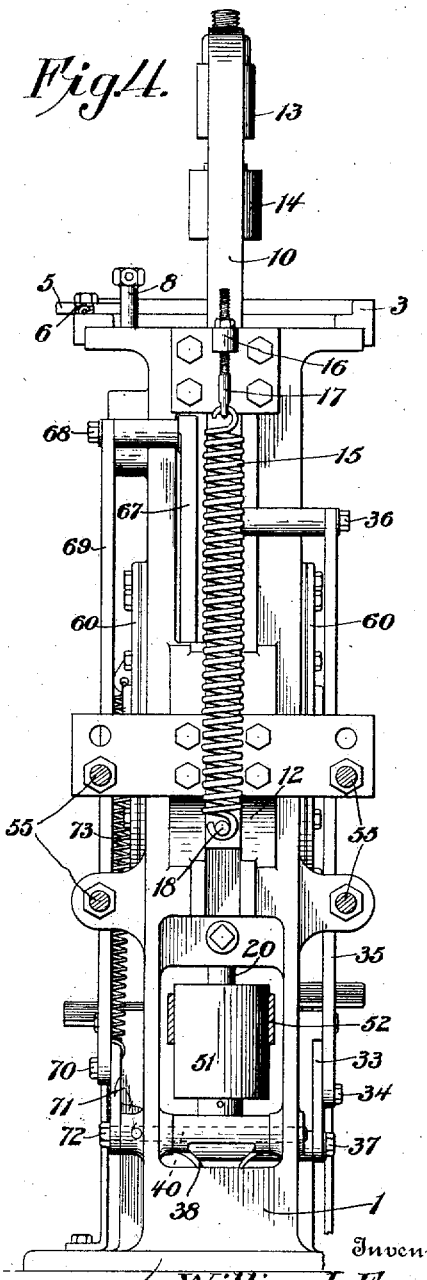
Figure 4 is a rear elevation with the motor removed.
Figure 5:
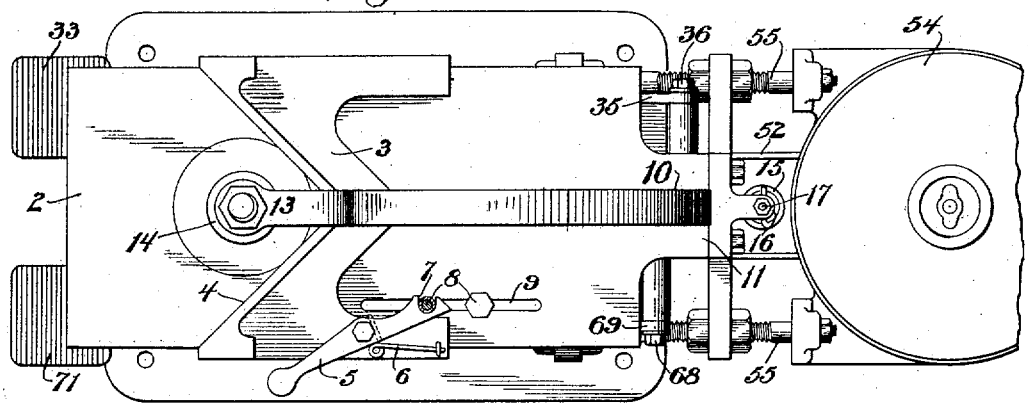
Figure 5 is a plan view.
Figure 6:
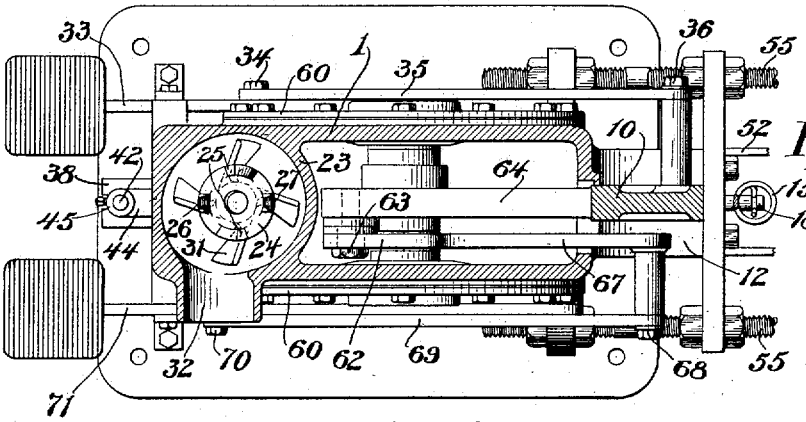
Figure 6 is a horizontal section taken on the line 6—6 of Figure 2.

After the channel has been cut in the work 30 the latter is turned over, to the position shown in Figure 3. The pedal 71 is then depressed to swing the dog 62 forwardly about its pivot 63. This causes the crank 56ᵃ first to engage the nose 65 and, in conjunction with the pressure exerted on the dog by the action of the pedal, draws the head downwardly until resistance is encountered. The crank will then have ridden into the notch 66 and will forcibly engage the outer side 74 thereof. This outer side 74 is cut at such an angle that the crank 56ª approaches it very nearly at right angles. A comparatively light pressure on the pedal 71, therefore, will hold the dog in engagement with the crank 56ª until the latter exerts a very powerful pressure downwardly on the dog to force the ram 14 downwardly with tremendous force. The side 74, however, has a very slight outward inclination, so that when a certain pressure is reached which, of course, is proportional to the pressure exerted on the pedal 71, the dog 62 is thrown outwardly and the crank 56ª rides out of the notch, releasing the bar 10, and permitting it to move upwardly under the influence of the spring 15.

Figure 9:
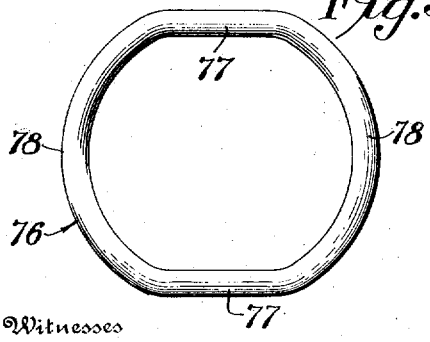
Figure 9 is a detail view of one form of ring.
Figure 11:
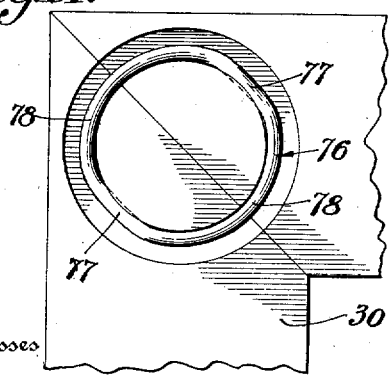
Figure 11 is a view showing a completed joint.
Figure 12:
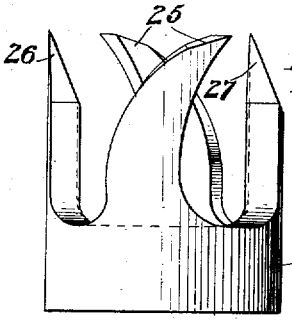
Figure 12 is an enlarged view of the cutter head detached.

In cutting the circular channel in the work 30, the latter is clamped to the table by the engagement of the rim of the ram 14 with the front face of the work. After the channel has been cut, and the work placed in the position shown in Figure 3, a steel block 75 is placed thereon, which is in the shape of a frustum of a cone, with its base of slightly less diameter than that of the boss formed within the circular channel. A ring 76 of steel is placed over the smaller end of the block 75. This ring may be of the shape shown in Figures 9 and 11, having a plurality of opposed straight sides 77 connected by arcuate portions 78. As the ram 14 is forced downwardly, the edge of its rim engages the ring, and forces it downwardly into the circular channel which has been formed in the wood. During this operation, the mid-points of the sides 77 are forced outwardly, causing the sides to assume substantially an arcuate shape, while the arcuate portions 78 are elongated, and their mid-points are drawn inwardly. The greater the pressure, the more nearly the ring approaches to a true circle. The ring is made strong and of heavy gage, and its total inside perimeter is scarcely more than the inside perimeter of the channel, so that a tremendous pressure is required to force the ring into position, and the tendency of the ring to resume its original shape causes the joint to be held tightly together with enormous pressure.

Figure 10:
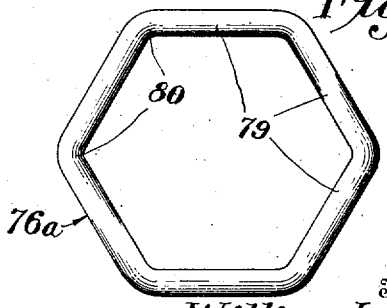
Figure 10 is a detail view of another form of ring.
Figure 7:
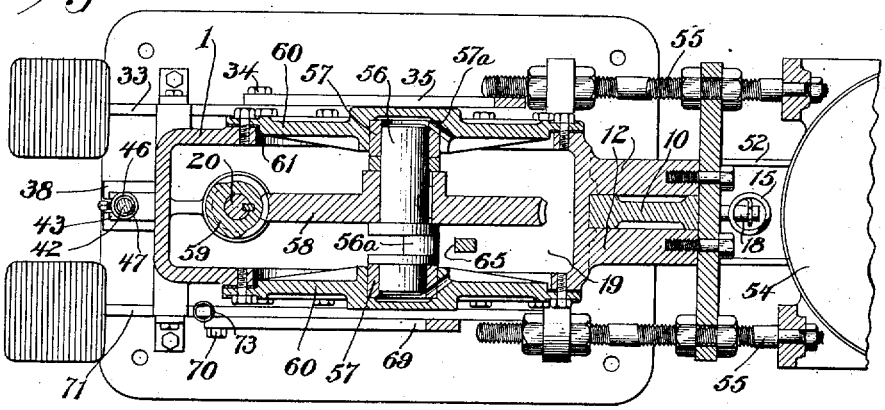
Figure 7 is a horizontal section taken on the line 7—7 of Figure 2.
Figure 8:
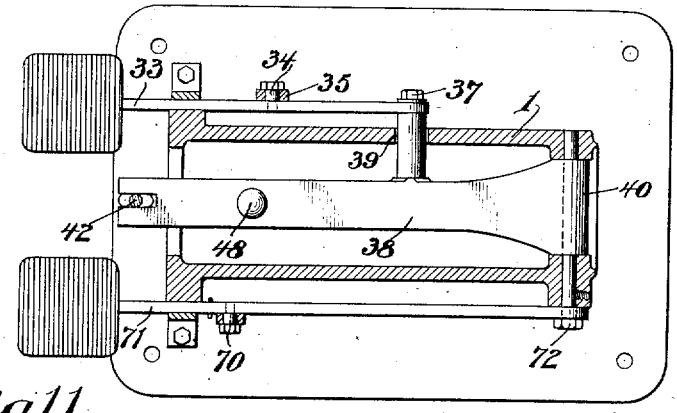
Figure 8 is a horizontal section taken just above the pedal mechanism.

The ring may be made in different shapes as, for example, that shown at 76ª in Figure 10, which is substantially in the form of a polygon, having a plurality of substantially straight sides 79. In applying such a ring to the joint, the mid-points of the sides 79 are forced outwardly, so that the sides assume substantially an arcuate form, and the corners 80 are drawn inwardly, and the ring approaches more nearly to a circular shape as it is forced downwardly over the larger end of the block 75.

As explained above, the trim, or other material, to be joined is placed in position beneath the ram 14, and a depression of the pedal 33 first causes the trim to be clamped on the table, and then causes the cutter to rise into contact with the under surface of the trim. The tension of the spring 15 may be adjusted with respect to the tension of the spring 46, so that the work will be clamped with the desired force before the cutter is raised. The stop 49 may be adjusted to determine the depth to which the circular channel is cut. After the pedal 33 is released, although the shaft 56 and worm gear 58 continue to rotate, their weight and the high speed of rotation causes considerable frictional resistance and this resistance, aided by gravity, causes the left-hand worm and the cutter shaft to work downwardly to their original position. The work is then turned the other side up, and the same head, which clamped the work while the channel was being cut, is used to force the ring into place.

It will, of course, be understood that different type and sizes of attachments may be used with the machine, depending upon the nature of the work to be performed. In joining molded trim, a Babbitt metal form is fitted to its face, so that it will rest solidly on the table while the ring is being applied. In connecting long pieces, trestles may be provided for supporting their free ends. While I have shown and described specifically one form in which the invention may be embodied, it is to be understood that various modifications may be made in the structure and arrangement of the various parts without any material departure from the essential features thereof as defined in the appended claims.

What is claimed is:

1. In a machine of the class described, the combination of a table, a vertically movable bar having a head overhanging the table, a pedal having a connection with said bar to move the latter downwardly when said pedal is depressed, a power-driven shaft, means for temporarily connecting said shaft to the bar to forcibly urge the latter downwardly, a second pedal, and means connecting the same to said first-mentioned means to establish the temporary connection between the shaft and the bar when said second pedal is depressed.

2. In a machine of the class described, the combination of a table, a vertically movable bar having a head overhanging the table, a pedal having a connection with said bar to move the latter downwardly when said pedal is depressed, a power driven shaft having a crank, a dog pivotally connected to said bar and having a notch therein, said dog being so arranged that it may be swung to bring the notch into position to be engaged by the crank on the downward portion of its movement, a second pedal, and means connecting the same to the dog to establish the connection between the latter and the crank so as to forcibly urge the bar downwardly.

3. In a machine of the class described, the combination of a table, a vertically movable bar having a head overhanging the table, an actuating member having a connection with said bar to move the latter downwardly to clamp the work when said member is depressed, a constantly driven shaft having a cutter secured thereon, means operable upon further depression of said member to move the shaft so that the cutter will operate on the work, a second shaft constantly driven by the cutter shaft, means for temporarily connecting said second shaft to the bar to forcibly urge the latter downwardly, a second actuating member, and means connecting the same to said first-mentioned means to establish the temporary connection between said second shaft and the bar when said second actuating member is depressed.

4. In a machine of the class described, the combination of a table, a vertically movable bar having a head overhanging the table, a pedal having a connection with said bar to move the latter downwardly to clamp the work when the pedal is depressed, a constantly driven shaft having a cutter secured thereto, means operable upon further depression of the pedal to move said shaft so that the cutter may operate on the work, a second shaft having a crank, means for driving said second shaft, a dog pivotally connected to said bar and having a notch therein, said dog being so arranged that it may be swung to bring the notch into position to be engaged by the crank on the downward portion of its movement, a second pedal, and means connecting the same to the dog to establish the connection between the latter and the crank so as to forcibly urge the bar downwardly.

5. In a machine of the class described, the combination of a table, a vertically movable bar having a head overhanging the table, a power-driven shaft having a crank, a member connected to said bar and normally out of the path of the crank, and means for shifting said member into the path of the crank so as to be engaged thereby to forcibly move the bar and head downwardly.

6. In a machine of the class described, the combination of a table, a vertically movable bar having a head overhanging the table, a power driven shaft having a crank, an actuating member, means actuated by the depression of said member for connecting the crank to the bar to exert a downward force on the latter which is directly proportional to the force with which said actuating member is depressed.

7. In a machine of the class described, the combination of a vertically movable member, a link connected at its upper end to said member, a pedal intermediately pivoted to the lower end of the link, a lever fulcrumed at one end and intermediately pivoted to the rear end of said pedal, a second vertically movable member in the path of said lever so as to be raised thereby, and resilient means resisting the movement of said lever, whereby the first of said members is actuated by the link with a predetermined force before the lever begins to move.

8. In a machine of the class described, the combination of a member mounted for rectilinear movement, a link connected at one end to said member, an actuating member intermediately pivoted to the other end of the link, a lever fulcrumed at one end and intermediately pivoted to the rear end of said actuating member, a second rectilinearly movable member in the path of said lever so as to be moved thereby, and resilient means resisting the movement of said lever, whereby the first rectilinearly movable member is actuated by the link with a predetermined force before the lever begins to move.

9. A ring joint machine comprising, in combination, a work table; a vertically movable ram member above the table; a foot pedal operatively connected to said ram member to move the latter downwardly when said pedal is depressed; a power driven shaft; means for temporarily connecting said shaft to forcibly urge the ram downwardly; a second pedal; and means connecting said second pedal to said first-mentioned means to establish the temporary connection between the shaft and the ram member when said second pedal is depressed.

10. A ring joint machine comprising, in combination, a work table; a vertically movable bar supported above said table; an actuating member having a connection with said bar to move the latter downwardly to clamp the work when said member is depressed; a constantly driven shaft having a cutter secured thereon; means operable upon further depression of said member to move the shaft so that the cutter will operate on the work; a second shaft constantly driven by the cutter shaft; means for temporarily connecting said second shaft forcibly to urge the bar downwardly; a second actuating member; and means connecting the same to the first-mentioned means to establish the temporary connection between said second shaft and the bar when said second actuating member is depressed.

11. A ring joint machine comprising, in combination, a work table ; a vertically movable bar above said table; a power driven shaft having a crank; a member pivotally connected to said bar and normally out of the path of the crank; and a lever connected to said member and arranged to shift it into the path of the crank so as to be engaged thereby to forcibly urge the bar downwardly.

12. A ring joint machine comprising, in combination, a work table; a vertically movable bar above the work table; a power driven shaft having a crank; an actuating member for the bar; a pivoted latch on the bar actuated by the depression of said member operatively connecting the crank to the bar, whereby to force the bar downwardly.

13. In a ring joint machine, a work table; a vertically movable cutter shaft having a cutter thereon adapted to cut a ring-receiving channel in the work; a foot pedal operatively connected to the shaft to manipulate the cutter; a ram above the table operatively connected to said pedal adapted to engage a ring and force it on the boss provided by said channel after the parts have been properly positioned; and ram operating means connected to said cutter shaft to exert final assembling pressure on the ring.

14. In a ring joint machine, a work table; a vertically movable cutter shaft having a cutter thereon adapted to cut a ring-receiving channel in the work; a foot pedal operatively connected to the shaft to manipulate the cutter; a ram above the table and having means arranged to clamp the work while the cutter is operating to engage a ring and force it on the boss provided by said channel when the parts are properly positioned; speed reduction gearing connected to said cutter shaft; and ram operating means operatively connected to said speed reduction gearing to exert final ring assembling pressure.

15. In a ring joint machine, a work table; a vertically movable cutter shaft having a cutter thereon adapted to cut a ring-receiving channel in the work; a foot pedal operatively connected to the shaft to manipulate the cutter; a ram above the table having means to engage a ring and force it on the boss provided by said channel when the work and parts are properly positioned; manual means connected initially to force the ram into engagement with a ring; and power operating means connected to said cutter shaft to exert final assembling pressure on the ring.

16. In a ring joint machine, a work table; a vertically movable cutter shaft having a cutter thereon adapted to cut a ring-receiving channel in the work; a foot pedal operatively connected to the shaft to manipulate the cutter; a ram above the table having means to engage a ring and force it on the boss provided by said channel when the work and parts are properly positioned; a worm on the cutter shaft; a worm wheel meshing with the worm; a worm wheel shaft having a crank; and means operatively connecting the crank to said ram to exert assembling pressure on the ring.

17. In a ring joint machine, a work table; a vertically movable cutter shaft having a cutter thereon adapted to cut a ring-receiving channel in the work; a foot pedal operatively connected to the shaft to manipulate the cutter; a ram above the table having means to engage a ring and force it on the boss provided by said channel when the work and parts are properly positioned; lever means connected to initiate the ring assembling movement of the ram; a worm on the cutter shaft; a worm wheel meshing with the work; a worm wheel shaft having a crank; a pivoted member operatively connecting the crank to said ram to exert assembling pressure on the ring; and manual actuating means connected to said pivoted member initially to operate the ram and then to shift the final operation to said crank.

18. In a ring joint machine of the character described, a rotary cutter adapted to cut a ring-receiving channel in the work; a ram having means for forcibly applying a ring to the boss provided by the channel when the parts are properly positioned; lever means connected to initiate the ring assembling movement of the ram; a cutter shaft; and power connections between said cutter shaft and said ram to apply final assembling pressure on the ring.

19. A ring joint machine comprising, in combination, a work table; a rotary cutter mounted to be moved into and out of engagement with the work and adapted to form a boss thereon; a ram above the table having means to force a ring on said boss when the parts are properly positioned; and operating connections between said ram and the source of power for driving the cutter.

20. A ring joint machine comprising in combination, a work table; a cutter shaft; a cutter on the shaft adapted to cut a ring-receiving channel in the work; a ram above the table having means to force a ring on the boss provided by the channel when the parts are properly positioned; a crank driven by the cutter shaft; and means operatively connecting the ram to the crank to exert final assembing pressure on the ring.

21. A ring joint machine comprising, in combination, a work supporting table; a power driven cutter for forming a boss on the work; a ram above the table having means to force a ring on the boss after the parts are properly positioned; and means operatively connecting the ram to the source of power for the cutter to exert assembling pressure on the ring.

In testimony that I claim the foregoing as my own, I have hereunto affixed my signature.

WILLIAM L. EVANS.